United States Patent
Barta et al.

(10) Patent No.: US 6,902,109 B2
(45) Date of Patent: *Jun. 7, 2005

(54) PARCEL DELIVERY NOTICE

(75) Inventors: Craig Barta, Atlanta, GA (US); Matt Miller, Atlanta, GA (US); Daniel Garcia, Norcross, GA (US); Scott Aubuchon, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/646,375

(22) Filed: Aug. 20, 2003

(65) Prior Publication Data

US 2004/0084519 A1 May 6, 2004

Related U.S. Application Data

(63) Continuation of application No. 09/815,745, filed on Mar. 23, 2001, now Pat. No. 6,634,551.
(60) Provisional application No. 60/203,402, filed on May 11, 2000.

(51) Int. Cl.$^7$ .............................................. G06F 17/60
(52) U.S. Cl. ...................................................... 235/385
(58) Field of Search ................................. 235/385, 375; 705/22

(56) References Cited

U.S. PATENT DOCUMENTS

| | | |
|---|---|---|
| 4,556,944 A | 12/1985 | Daniels et al. |
| 4,921,107 A | 5/1990 | Hofer |
| 5,208,449 A | 5/1993 | Eastman et al. |
| 5,263,118 A | 11/1993 | Cornelison |
| 5,305,244 A | 4/1994 | Newman et al. |
| 5,362,949 A | 11/1994 | Gulick |
| 5,667,834 A | 9/1997 | Rubio et al. |
| 5,869,819 A | 2/1999 | Knowles et al. |
| 6,021,942 A | 2/2000 | Monico |
| 6,400,829 B1 | 6/2002 | Petkovsek |
| 6,634,551 B2 * | 10/2003 | Barta et al. .................. 235/385 |
| 2002/0035557 A1 | 3/2002 | Nagahara |
| 2003/0110170 A1 | 6/2003 | Matsuoka |

FOREIGN PATENT DOCUMENTS

| | | |
|---|---|---|
| WO | WO 01/99037 A1 | 12/2001 |
| WO | WO 02/08994 A2 | 1/2002 |

OTHER PUBLICATIONS

Canada Post Corporation, https://obc.canadapost.ca/emo/basicPin.do?language–en Accessed in Jul. 2004. Applicant makes no admission that this reference constitutes prior art.

* cited by examiner

*Primary Examiner*—Thien M. Le
*Assistant Examiner*—Lisa M. Caputo
(74) *Attorney, Agent, or Firm*—Alston & Bird LLP

(57) ABSTRACT

Generally described, under on aspect of the invention, a single unique delivery notice is left at the particular location. However, just before it is left, this notice is electronically "linked" to the parcel(s) which were undeliverable. This can be done by a handheld portable data acquisition device which includes a conventional scanning means, allowing information to be scanned from the delivery notice as well as labels on the parcels, and stored on the handheld portable data acquisition device. If ten parcels were undeliverable, only one delivery notice is left behind but is electronically "linked" to all ten packages. The intended recipient can then contact the delivery service via the internet (or other suitable network) or by phone, by using information provided on the delivery notice. By providing the delivery service with unique information from the delivery notice, the intended recipient can get valuable information regarding the undelivered parcels. Such information can include shipper name, how many packages from each shipper, time of attempted delivery, COD status, etc. Arrangements can then be made to have the package(s) redelivered, held at a local operation center, redirected, or returned.

34 Claims, 9 Drawing Sheets

20

Service Attempts:
UPS makes up to three delivery attempts (excluding Sat./Sun. & holidays).
To prevent your package from being returned to sender, call 1-800-833-9943 and arrange for pickup.
Delivery change requests must be made prior to 7:00 p.m.
Except for C.O.D.s, UPS will hold your package for five business days after final delivery attempt.
UPS automatically returns all C.O.D. packages to sender the same day the final delivery attempt is made.

29

Signatures Required:
If the "Signature required on delivery" box is checked, the driver must receive a signature and hand the package to a person.
If the "Adult signature required on delivery" box is checked, the driver must receive an adult signature and hand the package to the adult (min. 21 years of age).

C.O.D. Check Requirements:
When the "Cashier's check, official bank check or money order only" box is marked, UPS has been instructed by the sender to accept only these methods of payment, payable to sender.

Customer Comments:
To have package delivered to a neighbor, write details in this section. (Does not apply to "Adult signature required" deliveries.)

Sign To Have Package Delivered (When Checked):
When the "Sign to have package delivered" box is checked, you can authorize the driver to leave the package. Sign below and return the notice to original location.

Your signature _____

Print name _____

*Fig. 3B*

InfoNotice Package List

UPS Package Tracking - Microsoft Internet Explorer

File Edit View Favorites Tools Help

Address http://www.sample.com

Service Guide Download Customer Service About UPS Site Guide

TRACK  SHIP  QUICK COST  TRANSIT TIME  PICKUP  DROP-OFF  SUPPLIES

TRACKING NUMBER | REFERENCE NUMBER

Tracking Detail

| | |
|---:|:---|
| Status: | First Attempt |
| Next Delivery Attempt: | May 17, 2000 |
| Scheduled Delivery: | May 16, 2000 |
| Delivery Attempt: | May 26, 2000 11:42 A.M. |
| Shipper Name: | POTTINGSWORTH INC. |
| COD: | $47.00 |
| COD Control #: | 4321 |
| Payment Method: | Check |
| InfoNotice Number: | 91 1098 7654 321 |
| Tracking Number: | A000 0000 000 |
| Service Type: | NEXT DAY AIR SAVER |

PACKAGE PROGRESS

| Date | Time | Activity | Location |
|---|---|---|---|
| June 30, 1999 | 5:28 P.M. | RECEIVER NOT IN ON 1ST DELIVERY ATTEMPT | DEERFIELD EAST, FL, US |
| Feb. 4, 1999 | 1:37 P.M. | DELIVERY | HIALEAH, METRO, FL, US |
| Jan. 29, 1999 | 10:00 A.M. | DELIVERY | BRISTOL, GB |

Tracking results provided by UPS

InfoNotice Tracking Detail

Fig. 6

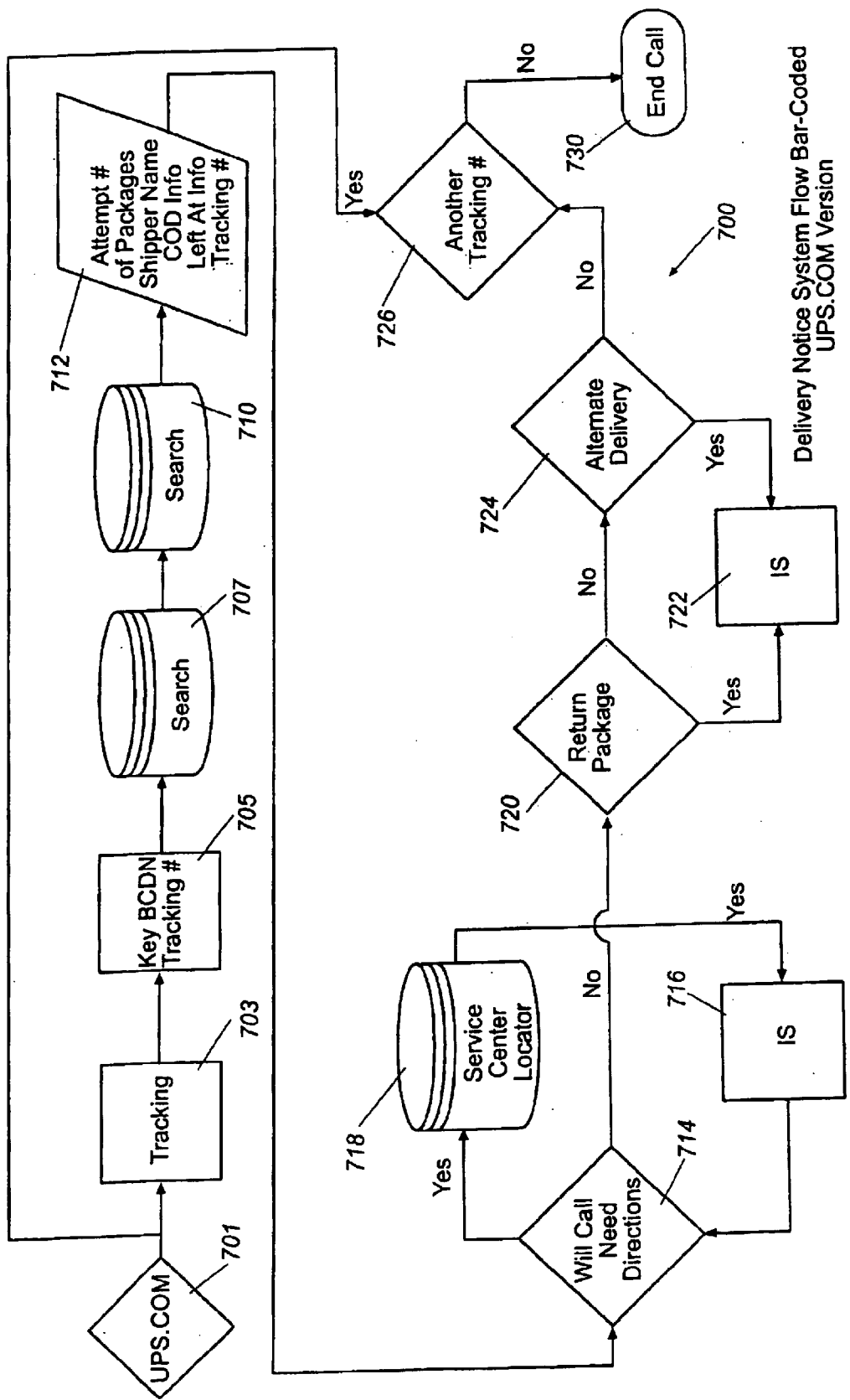

PARCEL DELIVERY NOTICE

CROSS-REFERENCE TO RELATED APPLICATIONS

This continuation patent application claims the benefit and priority of U.S. application Ser. No. 09/815,745, now U.S. Pat. No. 6,634,551 filed Mar. 23, 2001 and issued Oct. 21, 2003, which itself claims the benefit and priority of U.S. provisional patent Application No. 60/203,402, filed May 11, 2000, and likewise incorporates both the patent and the application by reference.

FIELD OF THE INVENTION

The present invention generally relates to delivery of items, and particularly relates to the delivery of items such as parcels (a.k.a. "packages") from a delivery service provider (hereinafter "delivery service"), to an intended recipient (a.k.a. "consignee").

BACKGROUND OF THE INVENTION

The delivery of parcels and other items to the residence of intended recipients is well known in the art.

Under the prior art, when a parcel is undeliverable, a "delivery notice" is left at the particular location, and the intended recipient then has the opportunity to call the delivery service (e.g. UPS) via telephone and arrange to have the package(s) redelivered, held at a local operation center, redirected, or returned. However, the consumer does not know much about the parcel(s) (e.g., who sent it to them) or even how many parcels were undeliverable.

The delivery service can use the address of the customer to determine the delivery center location, as well as the truck which included the customers route. The delivery service will then pull the package from the truck (after matching the customer's name with the parcel(s)) and attend to the necessary handling of the parcel.

As may be understood, such activities are labor intensive.

An example of a delivery notice is shown in U.S. Pat. No. 6,021,942, entitled "Bar-Coded Label for 'Attempt to Deliver' Articles," issued Feb. 8, 2000, but this patent attempts to resolve issues of undeliverable parcels by providing a multi-sectioned form 10 which can be separated along various perforated section lines to allow portions of the form to be attached to the parcel and other portions to be left at the delivery address.

In light of the above, it may be seen that there is a need in the art to provide an improved method for providing package or other item delivery which is less labor intensive than the methods described above.

SUMMARY OF THE INVENTION

Generally described, the present invention provides an improvement over the known prior art by providing a link between a delivery notice (such as those left on the door of a residential location) to a tracking number on the package.

Generally described, the present invention provides a system for delivering a plurality of unique items each having unique identities and each having a different machine-readable item code readable therefrom, the system comprising a plurality of delivery notices, each of the delivery notices including a machine-readable delivery notice code thereon, each of the delivery notice codes being unique within the plurality of delivery notices, a code-reading device configured to read the machine-readable delivery notice code from one of the delivery notices as well as to read the machine-readable item code from each of the plurality of items, such that a delivery notice code is read and a plurality of item codes are read; and a code storing device, the device configured to store the delivery notice code and the plurality of item codes.

More particularly described, the present invention provides a method for delivering, to an intended recipient, a plurality of unique items each having unique identities and each having a different machine-readable item code readable therefrom, the method including the steps of: providing a plurality of delivery notices, each of the delivery notices including a machine-readable delivery notice code thereon, each of the delivery notice codes being unique within the plurality of delivery notices; attempting the delivery of the plurality of unique items at a designated address of the intended recipient under a set of predetermined delivery rules; delivering the items to the intended recipient if the delivery rules are met; retaining the items and proceeding to the following steps if the delivery rules are not met; machine reading the machine-readable delivery notice code from one of the delivery notices and storing corresponding electronic data associated with the machine-readable delivery notice code; machine reading the machine-readable item code from each of the plurality of items, and storing electronic data associated with the plurality of items; electronically linking the electronic data associated with the machine-readable delivery notice code with the electronic data associated with the machine-readable delivery notice code; reporting information regarding each of the plurality of unique items in response to receipt of a description of the one of the delivery notices from the intended recipient; and modifying delivery plans based upon subsequent instructions from the intended recipient.

Therefore it is an aspect of the present invention to provide an improved method of delivering parcels or other similar items.

It is a further aspect of the present invention to provide an improved method of delivering parcels or other similar items which is reliable.

It is a further aspect of the present invention to provide an improved method of delivering parcels or other similar items which is efficient.

Therefore it is an object of the present invention to provide an improved method of delivering parcels or other similar items which allows customers to obtain information about parcels which were initially undeliverable.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIGS. 3A and 3B are the first and second sides, respectively, of a delivery notice 20 according to the present invention. The notice in one embodiment is a piece of paper printed on both sides. The first side includes a machine-readable (first) delivery notice code 21, which corresponds to a human-readable (second) delivery notice code 22, which is in this case numerals, although it could be alphanumeric or any human readable format. Also included on the notice 20 is various other self-explanatory text on the notice in areas 23, 24, 25, 26, 27, and 29.

In one preferred embodiment, the machine-readable (first) delivery notice code 21 is the same as the alphanumeric human-readable (second) delivery notice code 22. However, it should be noted that such human-readable and the machine-readable codes do not have to be the same codes, although they do need to be associated or "linked" in order to provide the needed link between the code read by the customer and the notice code scanned by the driver.

Figure 4:
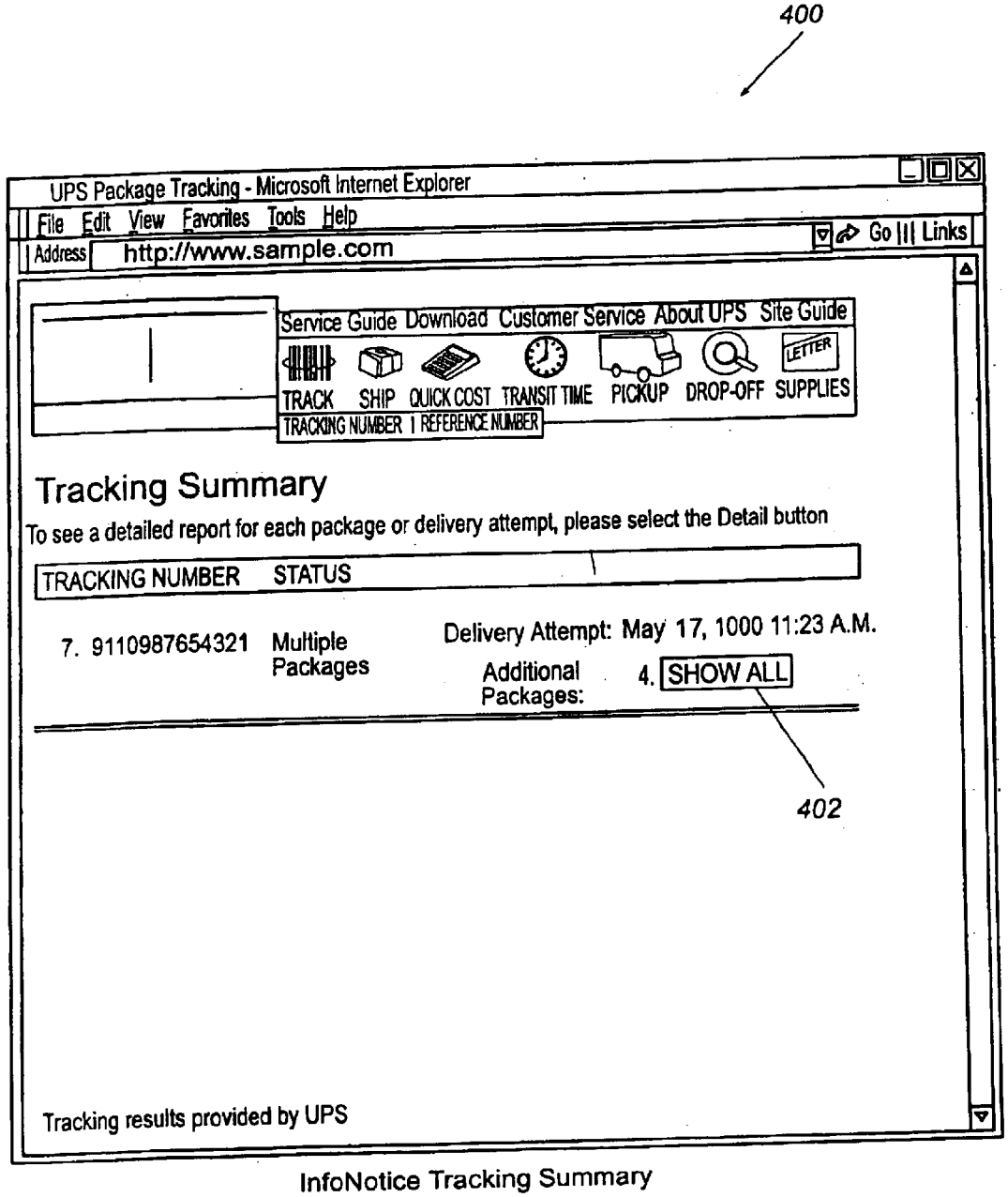

FIG. 4 shows a typical exemplary web page which the customer would see after entering the delivery notice code 22 which the customer read from the notice 20, which in this case is 9110987654321. The page, which could be referenced as the "Tracking Summary" page, shows that the delivery was attempted on May 17, 2000, at 11:25 A.M., and that four packages were in the attempted delivery. The customer can use the hyperlink at 402 to view that shown in FIG. 5.

Figure 5:
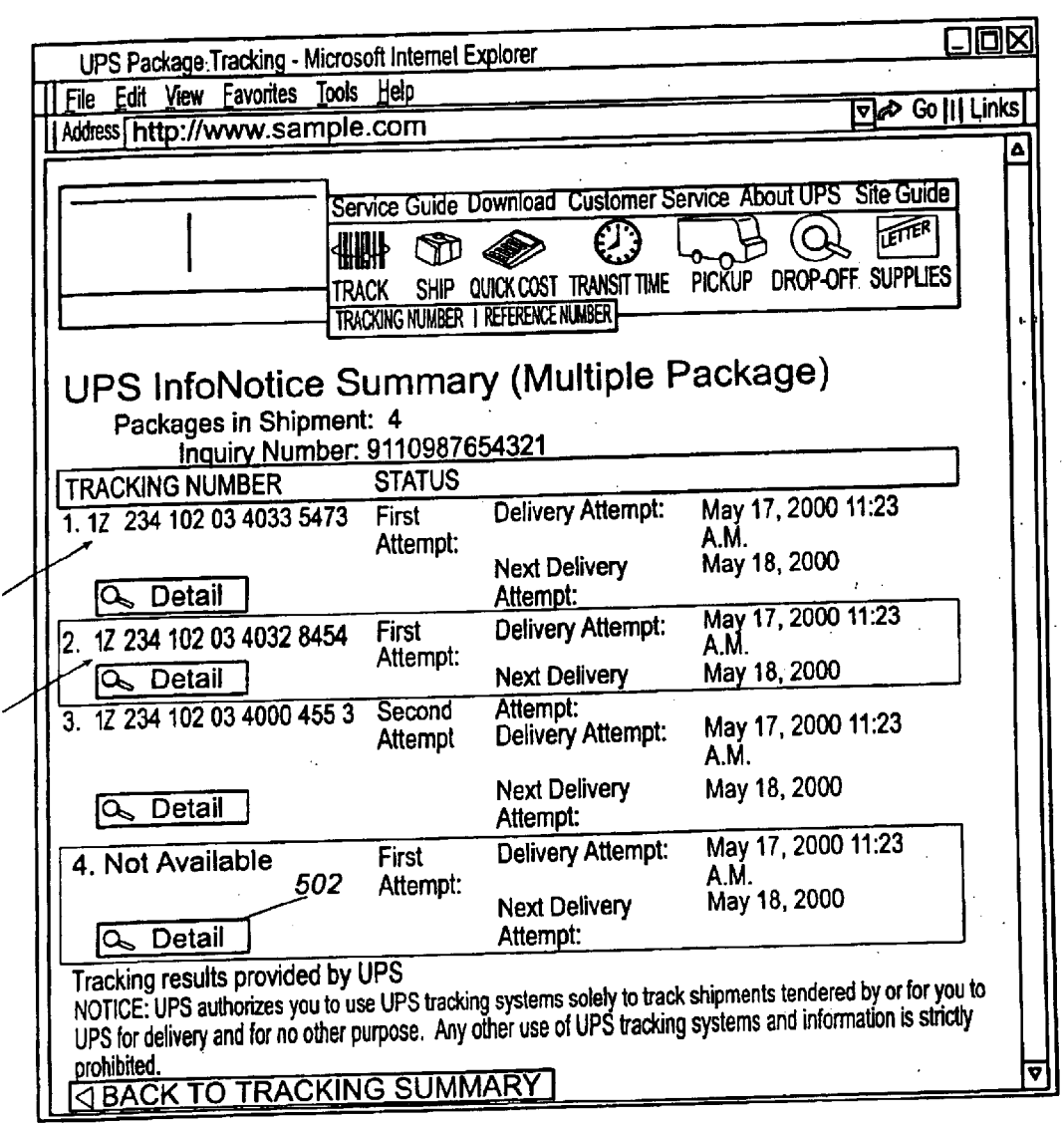

FIG. 5 shows a typical exemplary web page, entitled "UPS InfoNotice Summary (Multiple Package)", which shows more details of the four parcels shown related to notice code number 9110987654321. As may be seen, such details include the package tracking number (a.k.a. the "item code") for the individual packages, with the two exemplary parcel tracking numbers 111, 121, from FIG. 2 being denoted being shown as the first two packages in this list. As may also be seen, other package-related data is shown which is of informational value, such as when the delivery attempt was made, how many delivery attempts have been made, etc. Note that if further detail is required, the customer can select (or "click on") the hyperlink 502, to access a web page such as shown in FIG. 6.

FIG. 6 is a web page 600 which shows many details relating to a certain particular parcel. As may be understood, such information can be helpful to a customer. As may be seen, this page, entitled "Tracking Detail", shows the status as "First Attempt", the next delivery attempt as May 17, 2000, the original scheduled delivery as May 16, 2000, etc.

FIG. 7 shows a process 700 under the present invention in which the tracking system 10 is facilitated through the use of the internet.

Figure 8:
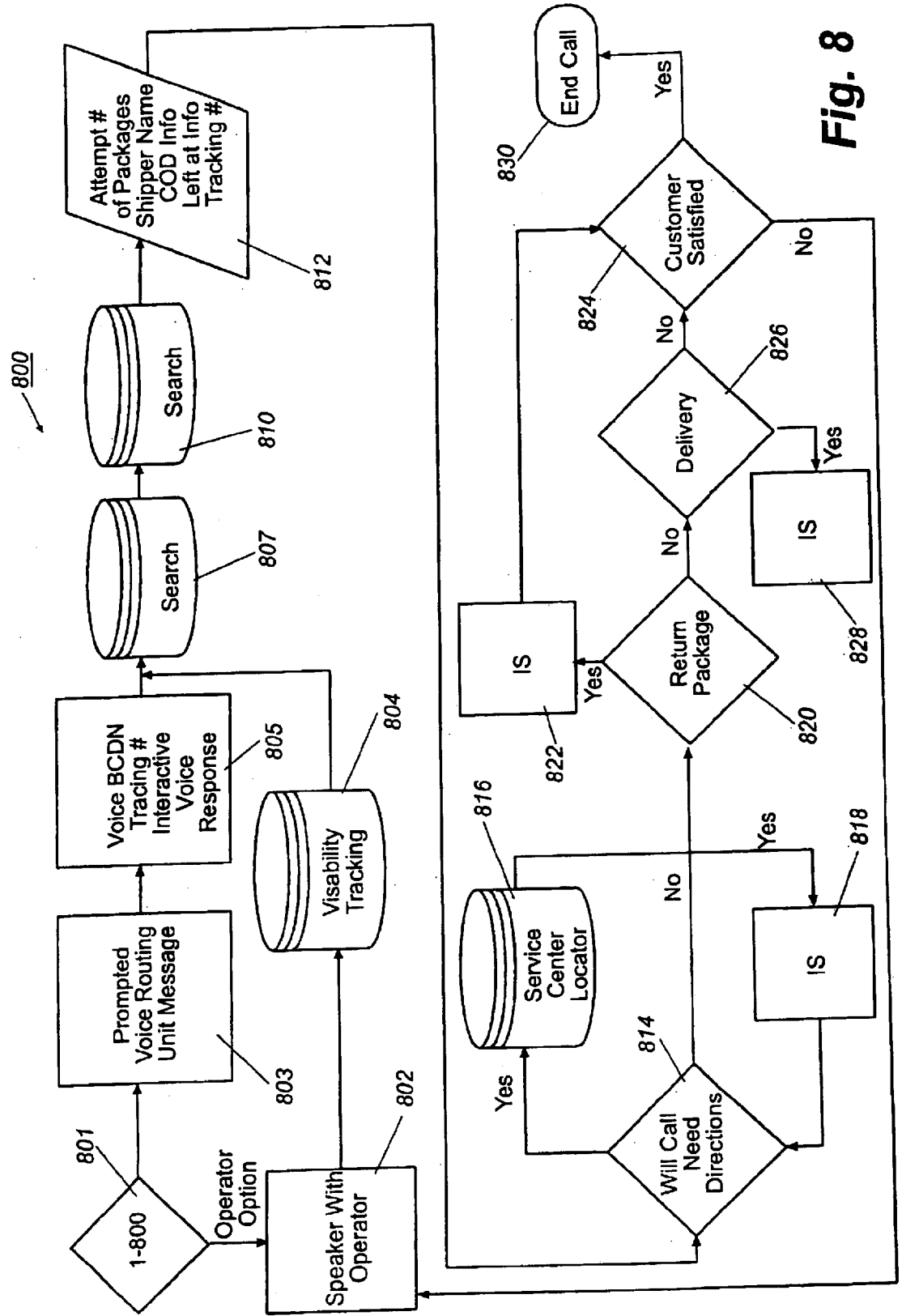

FIG. 8 is a flow chart of a process 800 in which the delivery notice is used by the customer in order to access a toll free number such as a "1-800" number.

DETAILED DESCRIPTION OF THE INVENTION

Reference is now made to the figures, in which like numerals indicate like elements throughout the several views.

General Discussion

Generally described, under on aspect of the invention, a single unique delivery notice is left at the particular location. However, just before it is left, this notice is electronically "linked" to the parcel(s) which were undeliverable. This can be done by a handheld portable data acquisition device which includes a conventional scanning means, allowing information to be scanned from the delivery notice as well as labels on the parcels, and stored on the handheld portable data acquisition device. If ten parcels were undeliverable, only one delivery notice is left behind, but it is electronically "linked" to all ten packages.

The intended recipient can then contact the delivery service via the internet (or other suitable network) or by phone, by using information provided on the delivery notice. By providing the delivery service with unique information from the delivery notice, the intended recipient can get valuable information regarding the undelivered parcels. Such information can include shipper name, how many packages from each shipper, time of attempted delivery, COD status, etc. Arrangements can then be made to have the package(s) redelivered, held at a local operation center, redirected, or returned.

More Detailed Discussion

More detailed discussion is now made.

The Overall System

Figure 2:
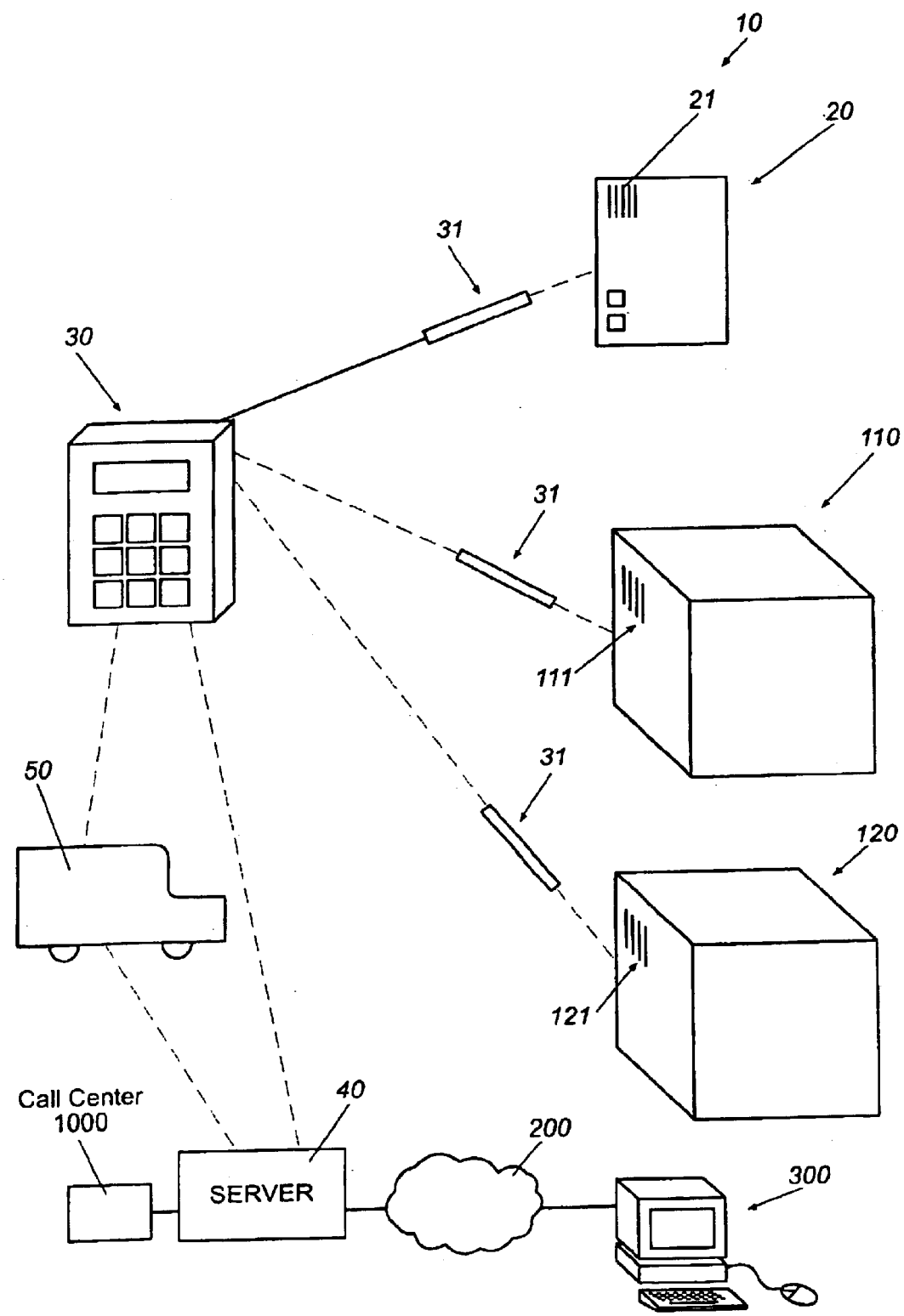
FIG. 2 is an illustrative view of the various data connections between various elements of the overall system 10 according to the present invention. The system 10 includes a delivery notice 20, a data acquisition device 30 having a scanning element 31, and a server 40. In an alternate embodiment the system can also include a parcel delivery car 50. In another independent alternate embodiment the system can also include an internet 200 connection or other suitable network connection to provide access to typical computers 300.

Reference is now first made to FIG. 2, which is an illustrative view of the various data connections between various elements of the overall system 10 according to the present invention. The system 10 includes a delivery notice 20, having a delivery notice code 21 thereon, a data acquisition device 30 having a scanning element 31, and a server 40. As discussed in detail later, in an alternate embodiment the system can also include a parcel delivery car 50. Also as discussed in detail later, the system can also include an internet 200 connection or other suitable network connection to provide access by customers (a.k.a. "users") to typical computers 300, or can include the use of a call center 1000.

The Delivery Notice 20

Figure 3A:

Reference is now made to FIGS. 3A and 3B, which combine to show one example of the type of delivery notices contemplated under the present invention, being a coded (e.g. bar coded) delivery notice 20. The notice in one embodiment is a piece of paper printed on both sides. The first side includes a machine-readable "first" delivery notice code 21, which corresponds to a human-readable "second" delivery notice code 22, which is in this case numerals, although it could be alphanumeric or any human readable format (in the embodiment shown the number is 9110987654321). Also included on the notice 20 is various other self-explanatory text on the notice in areas 23, 24, 25, 26, 27, and 29, with particular attention directed towards the text within area 26, which provides a telephone number to allow a person to call a telephone number to access tracking information at the web site shown.

In one preferred embodiment the codes 21 and 22 are the same code or at least include common code portions, although the use of different although associated codes is also contemplated under the spirit and scope of the present invention. However, it should be noted that such human-readable and the machine-readable codes do not have to be the same codes, although they do need to be associated or "linked" in order to provide the needed link between the code read by the customer and the notice code scanned by the delivery agent 100. As an example, the two codes could be different but linked together back at, for example, a central server.

Under one version of the prior art, a yellow delivery notice is used. It may be understood that the same or other colors could be used under the current invention.

The Packages

As shown in FIG. 2, the exemplary package 110 includes a machine-readable package code 111 (a.k.a. "item code"), which in one embodiment is a "tracking number" or "1Z" number as referenced by United Parcel Service, although obviously other package codes used to track or identify packages may also be used. The same is true for exemplary package 120 which includes a similar machine-readable package code 121. In both these cases in the preferred embodiment the machine-readable package code is in the form of visible indicia, although other non-visible means such as magnetic media, sound, texture, or the like may also be used without departing from the spirit and scope of the invention. In both these cases in the preferred embodiment the indicia is a bar code, although other codes are contemplated without departing from the spirit and scope of the invention.

The machine-readable package codes 111 and 121 are configured to be read by a code reader such as a bar code scanner such as known in the art, although other code readers are contemplated without departing from the spirit and scope of the invention.

Data Acquisition Device

Continuing to refer to FIG. 2, the system 10 according to the present invention also includes a data acquisition device 30 having a scanning element 31 (a.k.a. bar code reader) configured to scan the bar codes 21, 111, and 121 discussed above.

The data acquisition device 30 may be such as known under the mark "DIAD", equipped with a suitable scanner 31 and loaded with the appropriate hardware and software suitable to perform the scanning and data storage features noted below. Briefly stated, such scanning capabilities include the capabilities to scan machine-readable codes such as bar codes. The associated software and hardware include the capabilities of converting the readings from the scanner to appropriate digital data for storage within the data acquisition device. The digital acquisition device should also include appropriate hardware and software to allow such digital data to be transferred from the data acquisition device to an external storage means such as a centralized computer server 40 such as known in the art.

Server 40

Such a server 40 noted above can receive data from the data acquisition device through a direct route such as shown in dotted line, or through an indirect route also as shown in dotted line through hardware associated with the driver's package car 50. It should be understood that the type of connecting hardware or software is not essential to the present invention; many different types of data acquisition devices and transfer means may suffice.

Information on the server 40 is used to provide information for the intended package recipients through use of the internet 200 (or other suitable network) or alternately by use of telephone call centers such as 1000. As discussed in later detail, the intended package recipients provide the human-readable delivery notice code 22 over the internet or the telephone and receive information back about the undelivered parcel(s).

The Delivery Agent

Figure 1:
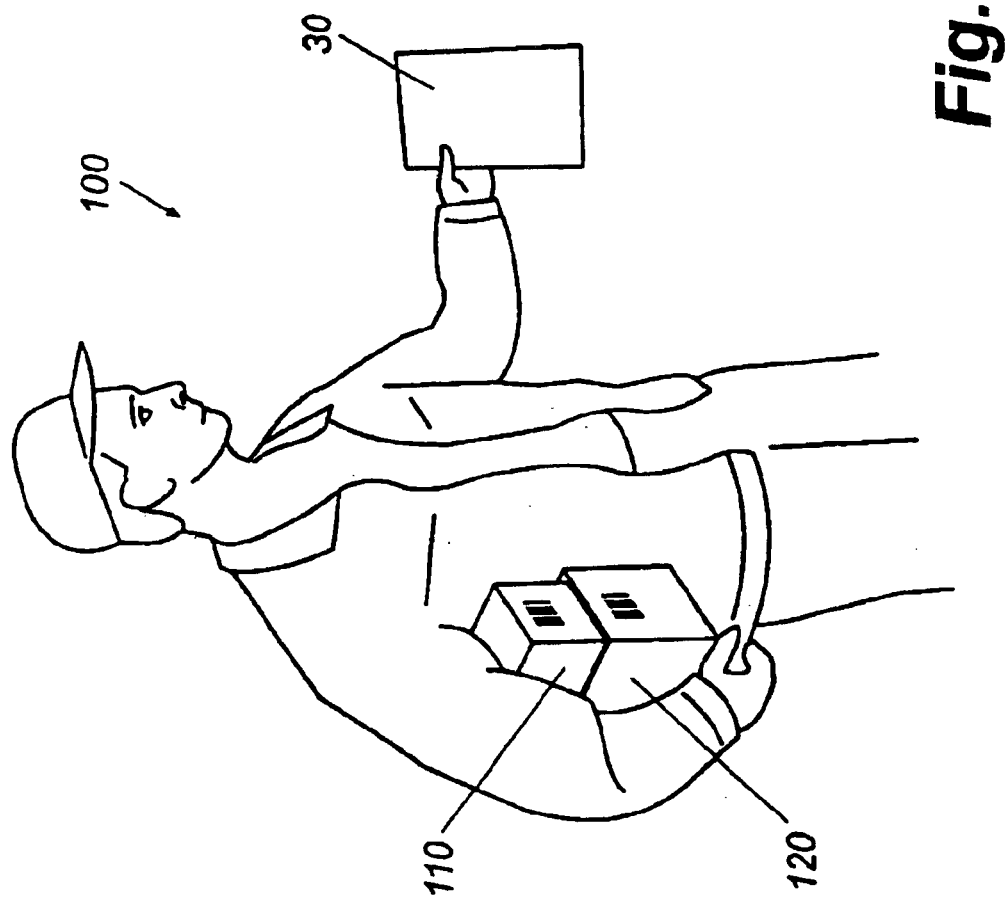
FIG. 1 is an illustrative view of a delivery agent 100 holding a plurality of parcels 110, 120, at the door of a typical address 123 Elm Street. As the parcels could not be delivered according to the agent's delivery rules, the agent has scanned a delivery notice 20 by use of a data acquisition device 30, and has left the notice 20 at the address 123 Elm Street.

Reference is now made to FIG. 1, which is an illustrative view of a delivery agent 100 holding a plurality of parcels 110, 120, at the door of a typical address 123 Elm Street. In the view shown, as the parcels could not be delivered according to the agent's delivery rules, the agent has scanned a delivery notice 20 by use of a data acquisition device 30, and has left the notice 20 at the address 123 Elm Street. The agent will in this instance not leave the parcels 110, 120 at the address, but will retain them for a redelivery attempt or for pick up by the intended addressee. This will now be discussed in detail in conjunction with an example.

EXAMPLE

It will first be assumed that a computer system from XYZ corporation is to be delivered in the form of two boxes, by a delivery agent 100 (working for a company such as, for example, UNITED PARCEL SERVICE) such shown generally in FIG. 1, to a customer address at 123 Elm Street. It will be assumed that two parcels 110, 120, are to be delivered, with each parcel including a different machine-readable parcel code (a.k.a. "item code") readable therefrom. It will also be assumed that an adult signature is required to leave the parcels at the customer's address.

It will also be understood that delivery agent will be equipped with at least a data acquisition device 30 and a delivery notice 20. Typically the delivery agent will carry a pad of multiple delivery notices.

The coded (e.g. bar coded) delivery notice 20 shown in FIGS. 3A and 3B is one example of the type of delivery notices contemplated under the present invention. The delivery notice includes, but it not limited to, a machine-readable delivery notice code 21, a human-readable delivery notice code 22 (in the embodiment shown the number is 9110987654321. In one preferred embodiment the codes 21 and 22 are the same code or at least include common code portions, although the use of different although associated codes is also contemplated under the spirit and scope of the present invention. As an example, the two codes could be different but linked together back at, for example, the central server.

Approach to Delivery Location

As noted, the delivery location is at 123 Elm Street. The delivery agent 100 (a.k.a. "driver") such as shown in FIG. 1 will arrive at the 123 Elm Street address. The driver will then access or "pull up" the address on the data acquisition device 30, and will scan with scanner 31 the codes 111, 121 on both packages 110, 120, respectively. The driver will then press "Enter" on the data acquisition device 30. This may be understood as the machine scanning of a machine-readable "item code" or "parcel code". The driver will then attempt delivery of the two parcels.

Delivery Possible

If someone is at home, the parcels will be delivered, and a suitable entry is made in the data acquisition device 30 such as shown in FIGS. 1 and 2. The delivery notice is not used.

No Delivery Possible

If no adult is at home, under the scenario presented above (a.k.a. "the predetermined rules"), the delivery agent cannot enter a signature, so the delivery agent makes an indication of non-delivery (e.g., a "not in" entry). At that time the data acquisition device will prompt the driver to scan a bar-coded delivery notice such as shown as 20 in FIGS. 2, 3A and 3B. The delivery agent will then pull a delivery notice out of his or her packet or other suitable storage location, and then will scan the machine-readable delivery notice code portion 21 on the notice 20 with the scanner 31 included in the data acquisition device 30. The delivery notice 20, but not the parcels, is to be left at the door.

Unless such information is already entered, the driver can also fill out preliminary information such as the date, attempt no., COD status, any other needed information, and will then press "stop complete" on the data acquisition device. This completes the creation of a delivery stop record, which, under one embodiment of the present invention, may include but is not limited to the following data fields: package delivery address, item code, delivery notice code(s), time and date, consignee, COD information, etc.

At this point the there has been a link between the bar coded delivery notice and the bar coded racking numbers on the two packages. The delivery notice 20 is left at the delivery address and the undelivered packages then go back into the delivery agent's vehicle.

When the intended recipient (a.k.a. "customer") comes home, he or she has the option of using two modes of communication with the delivery service (e.g. UPS); through a 1-800 line, or through the internet at, for example, UPS.COM or another suitable location.

The Internet Connection

Under this mode of communication, the customer goes to UPS.COM (or any other suitable internet or network location) and clicks on a "delivery notice" or other suitable icon or location. Such clicking would direct the customer to a web page that will prompt for and allow entry of the bar-coded delivery number.

By virtue of the above-referenced "link" between the delivery notice and the package information (which can be done through suitable database manipulation and control as known in the art) the customer can then be told by the delivery service that the customer has two packages which were previously undelivered. Any other relevant information can also be provided, such as information noting that the delivery service does not accept cash, and if a COD request is made, how and to whom payment should be made.

If desired, the individual parcel(s) can be tracked through current means associated with a tracking number.

At that time, the customer could then click on an icon allowing the customer to be linked to suitable locations which would allow the customer to have the delivery service leave the parcel at a local delivery center, the customer could refuse the parcel, the customer could ask for future delivery, or the customer could initiate a "delivery change" request, in which the customer could key in a new address. Such a new address could be automatically checked for validity by the delivery agent software by suitable means, and if the address is valid the parcel could be sent to the new address.

Reference is now made to exemplary web pages which may be used to facilitate such interaction between the customer and the delivery service. FIG. 4 shows a typical exemplary web page which the customer would see after entering the delivery notice code 22 which the customer read from the notice 20, which in this case is 9110987654321. The page, which could be referenced as the "Tracking Summary" page, shows that the delivery was attempted on May 17, 2000, at 11:25 A.M., and that four packages were in the attempted delivery. The customer can use the hyperlink at 402 to view that shown in FIG. 5.

FIG. 5 shows a typical exemplary web page, entitled "UPS InfoNotice Summary (Multiple Package), which shows more details of the four parcels shown related to the notice code number 9110987654321. As may be seen, such details include the package tracking number (a.k.a. the "item code") for the individual packages, with the two exemplary parcel tracking numbers 111, 121, from FIG. 2 being denoted being shown as the first two packages in this list. As may also be seen, other package-related data is shown which is of informational value, such as when the delivery attempt was made, how many delivery attempts have been made, etc.

For example, the first package listed has a package tracking number 111 of 1Z2341020340335473, the notice is associated with its first delivery attempt, this delivery attempt was May 17, 2000 at 11:23 AM, and its next delivery attempt will be at May 18, 2000.

The second package listed has a package tracking number 121 of 1Z2341020340328454, the notice is associated with its first delivery attempt, this delivery attempt was May 17, 2000 at 11:23 AM, and its next delivery attempt will be at May 18, 2000.

The third package listed has a package tracking number of 1Z2341020340004553, the notice is associated with its second delivery attempt, this delivery attempt was May 17, 2000 at 11:23 AM, and its next delivery attempt will be at May 18, 2000.

The fourth (and last) package listed has a package tracking number which is unavailable, the notice is associated with its first delivery attempt, this delivery attempt was May 17, 2000 at 11:23 AM, and its next delivery attempt will be at May 18, 2000.

As noted above, two attempts have been made to deliver the third package. It may be understood that it may also be possible that this package may have another earlier-in-time delivery notice associated with it corresponding to that earlier delivery attempt. If the customer uses the earlier-in-time deliver notice, then the same, most current, parcel information will be shown to the customer.

Note that if further detail is required, the customer can use or "click" on the hyperlink 502, to access a web page such as shown in FIG. 6.

FIG. 6 is a web page 600 which shows many details relating to a certain particular parcel. As may be understood, such information can be helpful to a customer. As may be seen, this page, entitled "Tracking Detail", shows the status as "First Attempt", the next delivery attempt as May 17, 2000, the original scheduled delivery as May 16, 2000, etc.

FIG. 7 shows a process 700 under the present invention in which the tracking system 10 is facilitated through the use of the internet.

At step 701, the customer begins access to the tracking system 10 by use of www.ups.com, or www.myups.com, or any other suitable location.

At step 703, the customer selects a particular tracking feature within the overall web site.

At step 705, the customer enters the delivery notice code 22 which the customer read from the notice 20 (which in the case described above was 9110987654321), and selects the necessary icon or other selection to send the delivery notice code 22 to the tracking system 10.

At step 707, the tracking system checks a database for delivery addresses.

At step 710, the tracking system checks a database for customer records.

At step 712, the tracking system presents certain information to the customer such as the information set forth in FIGS. 4–6. At this point, the customer may need no further information, such as in the case where the customer is aware of the time for the next delivery attempt. If this is the case, the customer will pass through steps 720, 724, 726, and 730, in many cases simply by moving to another web page or by logging off the internet.

However, it may be possible that the customer would like to call upon the service center where the parcel(s) are being held until the next delivery attempt, instead of waiting for delivery. In this case, step 714 allows the customer to execute a "Will Call" instruction to the tracking system 10. If the customer needs directions to the service center, step 718 allows for a web-based search and location function, based upon, for example, the customer's ZIP code.

Step 716 is a step which includes the use of a IS (information systems) tool which allows the customer (through adequate protection) to modify the records of the tracking system 10 relative to the item. In this case, if a "Will Call" is placed on the item, the item is to be held at a designated service center and step 716 modifies the records of the tracking system 10 to so reflect this instruction.

If the customer wants to return the package at decision step 720, step 722 is selected which allows for the records of the tracking system 10 to so reflect this instruction.

If the customer does not want to return the package, but wants to attend to alternate delivery at step 724, step 722 is selected, which as discussed above, allows for the records of the tracking system 10 to so reflect this instruction.

If at decision step 724 the customer wishes to enter another notice code, the customer is redirected to step 703. If not, the process (a.k.a. "call") is over.

The 1(800) Connection

As noted elsewhere, the customer will have a 1(800) telephone number provided by the delivery notice. Speech recognition software or prompts for entry of telephone keypad signals can allow a customer to have the delivery service leave the parcel at a local delivery center, to allow the customer to refuse the parcel, or to allow the customer to request ask for future delivery. However, if a "delivery change" request or another relatively complex request is made, the customer will likely be opted out to a live operator in order to attend to such matters.

Reference is now made to FIG. 8, which is a flow chart of a particular process 800 in which the delivery notice is used by the customer in order to access a toll free number such as a "1-800" number.

The first step in process 800 is step 801, in which the customer dials the toll free number and is connected. Typically the toll free number will be on the delivery notice.

If the customer wishes to speak to a live operator, step 802 is executed, and full visibility tracking is provided to the customer at step 804. This brings up information such as shown in FIGS. 4–6, but also additional information in the system which the operator deems needed. If full visibility tracking is not needed, step 807 is reached.

If the customer does not elect to opt out of automatic features, the process goes to step 803.

At step 803, a process begins which requests the customer to speak their notice code such as "please speak your notice code clearly at the beep".

At step 805, the instructions given by the customer are interpreted and converted into information such as the notice code. The system then has the notice code and proceeds to provide information relative thereto as described further herein.

At step 807, the tracking system checks a database for delivery addresses.

At step 810, the tracking system checks a database for customer records.

At step 812, the tracking system (through an automated menu-based response system) presents certain information to the customer such as the information set forth in FIGS. 4–6. At this point, the customer may need no further information, such as in the case where the customer is aware of the time for the next delivery attempt. If this is the case, the customer will pass through steps 820, 826, 824, and 830, in many cases simply by hanging up the phone.

However, it may be possible that the customer would like to call upon the service center where the parcel(s) are being held until the next delivery attempt, instead of waiting for delivery. In this case, step 814 allows the customer to execute a "Will Call" instruction to the tracking system 10. If the customer needs directions to the service center, step 816 allows for a telephonic-based search and location function, based upon, for example, the customer's ZIP code.

At step 818, the "Will Call" instructions can be added to the system as discussed elsewhere.

If the customer wants to return the package at decision step 820, step 822 is selected which allows a corresponding update to the system.

If at step 826, the customer wishes to elect future delivery, step 828 may be selected to update the system.

If at step 824, the customer is not satisfied, the customer will be routed to step 802 to speak with an operator.

If at step 824, the customer is satisfied, the customer can end the call.

Discussion of Terms

It should be understood that the term "scan" should be interpreted generally to mean the machine reading of a machine-readable code. This may include the type of bar code "scanning" in which a user moves a stylus across a bar code, but could also be interpreted to mean the use of a snapshot or other image grab which is then analyzed for bar code or other code presence and decoding as known in the art.

It should be understood that the system contemplates the use of a number (a.k.a. "plurality") of delivery notices, with each of the delivery notices including a machine-readable delivery notice code thereon, and each of said delivery notice codes being unique within the number of delivery notices used at least with respect to a subset of deliveries. This is not to say that the same delivery notice code may never be re-used, but it is preferred that the same delivery notice code would not be used for some amount of time to preclude the possibility of confusion.

It should be understood that the term "link" is used to denote an association between elements which can later be recalled. An "electronic link" between data includes the linking (with the appropriate linking software) of a "first" type of data (data in a first database field, e.g., delivery notice identification data) with a "second" type of data (data in a second database field, e.g., package identification data), such that the recall of the first type of data, when used with the appropriate linking software, allows for ready recall of the second type of data.

Alternatives

Note that the data acquisition device shown is used as an example, other data acquisition devices may be used under the invention.

Conclusion

While this invention has been described in specific detail with reference to the disclosed embodiments, it will be understood that many variations and modifications may be effected within the spirit and scope of the invention as described in the appended claims.

That which is claimed:

1. A system for delivering a plurality of unique items each having unique identities and each having a different machine-readable item code readable therefrom, said system comprising:

A) a delivery notice having a unique machine-readable delivery notice code thereon;

B) a code-reading device configured to read said machine-readable delivery notice code from said delivery notice as well as to read said machine-readable item code from each of said plurality of items, such that a delivery notice code is read and a plurality of item codes are read; and C) a code storing device, said device configured to store said delivery notice code and said plurality of item codes.

2. A system for delivering a plurality of unique items each having unique identities and each having a different machine-readable item code readable therefrom, said system comprising:
   A) a delivery notice having a unique machine-readable delivery notice code thereon;
   B) a code-reading device configured to read said machine-readable delivery notice code from said delivery notice as well as to read said machine-readable item code from each of said plurality of items, such that a delivery notice code is read and a plurality of item codes are read; and
   C) a code storing and linking device, said device configured to store said delivery notice code and said plurality of item codes and also configured to provide a link between said delivery notice code and said plurality of item codes.

3. A system for delivering a plurality of unique items each having unique identities and each having a different machine-readable item code readable therefrom, said system comprising:
   A) a delivery notice having a unique machine-readable delivery notice code thereon;
   B) a code-reading and storing device configured to read said machine-readable delivery notice code from said delivery notice, configured to read said machine-readable item code from each of said plurality of items, and configured to store said delivery notice code and said plurality of item codes; and
   C) a storing and serving device configured to receive information relating to said delivery notice code and said plurality of item codes from said code-reading and storing device, said storing and serving device also configured to provide information upon request relating to said plurality of unique items upon the receipt of information relating to said delivery notice.

4. The system as claimed in claim 3, wherein said storing and service device is configured to receive and provide said information via an internet connection.

5. A system for delivering a plurality of unique items each having unique identities and each having a different machine-readable item cede readable therefrom, said system comprising:
   A) a delivery notice having a unique machine-readable delivery notice code thereon;
   B) a code-reading and storing device configured to read said machine-readable delivery notice code from said delivery notice, configured to read said machine-readable item code from each of said plurality af items, and configured to store said delivery notice code and said plurality of item codes; and
   C) a storing linking and serving device configured to receive information relating to said delivery notice code and said plurality of item codes from said code-reading and storing device, said storing linking and serving device also configured to link said delivery notice code relative to said plurality of item codes to allow it to provide information upon request relating to said plurality of unique items upon the receipt of information relating to said delivery notice.

6. The system as claimed in claim 5, wherein said storing and service device is configured to receive and provide said information via an internet connection.

7. A system for delivering a plurality of unique items each having unique identities and each having a different machine-readable item code readable therefrom, said system comprising:
   A) a delivery notice having a unique machine-readable delivery notice code thereon;
   B) a code-reading device configured to read said machine-readable delivery notice code from said delivery notice, and also configured to read said machine-readable item code from each of said plurality of items;
   C) a code-storing device configured to store said delivery notice code and said plurality of item codes; and
   D) a linking device configured to link said delivery notice relative to said plurality of items.

8. The system as claimed in claim 7, further comprising:
   E) a reporting device for reporting information regarding each of said plurality of unique items in response to receipt of a description of said delivery notice.

9. A system for delivering a plurality of unique items each having unique identities and each having a different machine-readable item code readable therefrom, said system comprising:
   A) a delivery notice having a unique first machine-readable delivery notice code and a unique second human-readable notice code thereon,
   B) a code-reading device configured to read said machine-readable delivery notice code from said delivery notice, and also configured to read said machine-readable item code from each of said plurality of items;
   C) a code-storing device configured to store said delivery notice code and said plurality of item codes; and
   D) a linking device configured to link said delivery notice relative to said plurality of items; and
   E) a reporting device configured to report information regarding each of said plurality of unique items in response to receipt of said second human-readable notice code.

10. The system as claimed in claim 9, wherein said reporting device comprises a computer server configured to store data associated with said machine-readable delivery notice code from said delivery notice, and also configured to store data associated with said machine-readable item code.

11. The system as claimed in claim 9, wherein said reading in step "B" is done by scanning.

12. The system as claimed in claim 9, wherein said linking in step "D" is done electronically.

13. A method for delivering a plurality of unique items each having unique identities and each having a different machine-readable item code readable therefrom, said method including the steps of:
   A) providing a delivery notice having a unique machine-readable delivery notice code thereon;
   B) machine reading said machine-readable delivery notice code from said delivery notice and storing corresponding electronic data associated with said machine-readable delivery notice code;
   C) machine reading said machine-readable item code from each of said plurality of items, and storing electronic data associated with said plurality of items; and
   D) electronically linking said electronic data associated with said machine-readable delivery notice code with said electronic data associated with said plurality of items.

14. A method for delivering a plurality of unique items each having unique identities and each having a different machine-readable item code readable therefrom, said method including the steps of:
   A) providing a delivery notice having a unique machine-readable delivery notice code thereon;
   B) machine reading said machine-readable delivery notice code from said delivery notice and storing corresponding electronic data associated with said machine-readable delivery notice code;

C) machine reading said machine-readable item code from each of said plurality of items, and storing electronic data associated with said plurality of items;

D) electronically linking said electronic data associated with said machine-readable delivery notice code with said electronic data associated with said plurality of items; and E) reporting information regarding each of said plurality of unique items in response to receipt of a description of said delivery notice.

15. The method of claim 14, wherein in step "E", said receipt of a description of said delivery notice is accomplished at least in part by use of the internet, and wherein said reporting of said information regarding each of said plurality of unique items is accomplished at least in part by use of the internet.

16. A method for delivering a plurality of unique items each having unique identities and each having a different machine-readable item code readable therefrom, said method including the steps of:

A) providing a delivery notice having a unique machine-readable first delivery notice code and a unique human-readable second delivery notice code thereon;

B) machine reading said machine-readable delivery notice code from said delivery notice and storing corresponding electronic data associated with said machine-readable delivery notice code;

C) machine reading said machine-readable item code from each of said plurality of items, and storing electronic data associated with said plurality of items;

D) electronically linking said electronic data associated with said machine-readable delivery notice code with said electronic data associated with said plurality of items; and E) reporting information regarding each of said plurality of unique items in response to receipt of said human-readable second delivery notice code.

17. The method of claim 16, wherein in step "E", said receipt of said human-readable second delivery notice code is accomplished at least in part by use of the internet, and wherein said reporting of said information regarding each of said plurality of unique items is accomplished at least in part by use of the internet.

18. The method of claim 16, wherein in step "A", said machine-readable first delivery notice code includes common data relative to said human-readable second delivery notice code.

19. The method of claim 16, wherein said human-readable indicia is an alphanumeric sequence.

20. A method for delivering a plurality of unique items each having unique identities and each having a different machine-readable item code readable therefrom, said method including the use of a handheld data acquisition device and comprising the steps of:

A) providing a delivery notice having a unique machine-readable delivery notice code thereon;

B) machine reading said machine-readable delivery notice code from said delivery notice and storing corresponding electronic data associated with said machine-readable delivery notice code on said handheld data acquisition device;

C) machine reading said machine-readable item code from each of said plurality of items, and storing electronic data associated with said plurality of items on said handheld data acquisition device;

D) electronically linking said electronic data associated with said machine-readable delivery notice code with said electronic data associated with said plurality of items; and E) reporting information regarding each of said plurality of unique items in response to receipt of a description of said delivery notice.

21. The method of claim 20, wherein in step "E", said receipt of a description of said delivery notice is accomplished at least in part by use of the internet, and wherein said reporting of said information regarding each of said plurality of unique items is accomplished at least in part by use of the internet.

22. The method of claim 20, wherein in step "D", said linking is done on said handheld data acquisition device.

23. A method for delivering a plurality of unique items each having unique identities and each having a different machine-readable item code readable therefrom, said method including the use of a handheld data acquisition device and a computer server and comprising the steps of:

A) providing a delivery notice having a unique machine-readable delivery notice code thereon;

B) machine reading said machine-readable delivery notice code from said delivery notice and storing corresponding electronic data associated with said machine-readable delivery notice code on said handheld data acquisition device;

C) machine reading said machine-readable item code from each of said plurality of items, and storing electronic data associated with said plurality of items on said handheld data acquisition device;

D) transferring said electronic data associated with said machine-readable delivery notice code from said handheld data acquisition device to said server as well as transferring said electronic data associated with said plurality of items from said handheld data acquisition device to said server;

E) electronically linking said electronic data on said server associated with said machine-readable delivery notice code with said electronic data on said server associated with said plurality of items; and F) reporting information regarding each of said plurality of unique items in response to receipt of a description of said delivery notice.

24. The method of claim 23, wherein in step "F", said receipt of a description of said delivery notice is accomplished at least in part by use of the internet, and wherein said reporting of said information regarding each of said plurality of unique items is accomplished at least in part by use of the internet.

25. A method for delivering a plurality of unique items each having unique identities and each having a different machine-readable item code readable therefrom, said method including the steps of:

A) providing a delivery notice having a unique machine-readable delivery notice code thereon;

B) attempting the delivery of said plurality of unique items at a designated address under a set of predetermined delivery rules;

C) delivering said items if said delivery rules are met;

D) proceeding to the following steps if said delivery rules are not met;

E) machine reading said machine-readable delivery notice code from said delivery notice and storing corresponding electronic data associated with said machine-readable delivery notice code;

F) machine reading said machine-readable item code from each of said plurality of items, and storing electronic data associated with said plurality of items;

G) electronically linking said electronic data associated with said machine-readable delivery notice code with said electronic data associated with said plurality of items; and H) reporting information regarding each of said plurality of unique items in response to receipt of a description of said delivery notice.

26. The method of claim 25, wherein in step "H", said receipt of a description of said delivery notice is accomplished at least in part by use of the internet, and wherein said reporting of said information regarding each of said plurality of unique items is accomplished at least in part by use of the internet.

27. The method of claim 25, wherein in step "H", said receipt of a description of said delivery notice is accomplished at least in part by use of a telephone connection, and wherein said reporting of said information regarding each of said plurality of unique items is accomplished at least in part by use of a telephone connection.

28. A method for delivering, to an intended recipient, a plurality of unique items each having unique identities and each having a different machine-readable item code readable therefrom, said method including the steps of:

A) providing a delivery notice having a unique machine-readable delivery notice code thereon;

B) attempting the delivery of said plurality of unique items at a designated address of said intended recipient under a set of predetermined delivery rules;

C) delivering said items to said intended recipient if said delivery rules are met;

D) retaining said items and proceeding to the following steps if said delivery rules are not met;

E) machine reading said machine-readable delivery notice code from said delivery notice and storing corresponding electronic data associated with said machine-readable delivery notice code;

F) machine reading said machine-readable item code from each of said plurality of items, and storing electronic data associated with said plurality of items;

G) electronically linking said electronic data associated with said machine-readable delivery notice code with said electronic data associated with said machine-readable delivery notice code;

H) reporting information regarding each of said plurality of unique items in response to receipt of a description of delivery notice from said intended recipient; and I) modifying delivery plans based upon subsequent instructions from said intended recipient.

29. The method of claim 28, wherein in step "G", linking is provided on a computer server.

30. The method of claim 28, wherein in step "G", linking is first provided on a handheld device and then transferred to a computer server where said linking is again provided on said server.

31. The method of claim 28, wherein in step "H", said receipt of a description of said delivery notice is accomplished at least in part by use of the internet, and wherein said reporting of said information regarding each of said plurality of unique items is accomplished at least in part by use of the internet.

32. The method of claim 28, wherein in step "H", said receipt of a description of said delivery notice is accomplished at least in part by use of a telephone connection, and wherein said reporting of said information regarding each of said plurality of unique items is accomplished at least in part by use of a telephone connection.

33. A method for exchanging a plurality of unique items, each of said items having a unique identity, said method including the steps of:

A) associating with each of said items a different machine-readable item code;

B) providing a notice having a unique machine-readable notice code thereon;

C) machine reading said machine-readable notice code from said notice and storing corresponding electronic data associate d with said machine-readable notice code;

D) storing electronic data associated with said plurality of items based on said item code from each of said plurality of items; and E) electronically linking said electronic data associated with said machine-readable notice code with said electronic data associated with said plurality of items.

34. A method for delivering a plurality of unique items each having unique identities and each having a different machine-readable item code readable therefrom, said method including the steps of:

A) providing a first delivery notice having a first unique machine-readable delivery notice code thereon;

B) attempting a first delivery of said plurality of first unique items at a designated address under a set of predetermined delivery rules;

C) delivering said first plurality of items if said delivery rules are met;

D) proceeding to the following steps if said delivery rules are not met;

E) machine reading said first machine-readable delivery notice code from said first delivery notice and storing corresponding electronic data associated with said first machine-readable delivery notice code;

F) machine reading said machine-readable item code from each of said first plurality of items, and storing electronic data associated with said first plurality of items;

G) electronically linking said electronic data associated with said first machine-readable delivery notice code with said electronic data associated with said first plurality of items;

H) attempting a second delivery of said plurality of first unique items and at least one additional unique item at the designated address under a set of predetermined delivery rules;

I) delivering said first plurality of items and said at least one additional unique item if said delivery rules are met;

J) proceeding to the following steps if said delivery rules are not met;

K) providing a second delivery notice having a second unique machine-readable delivery notice code thereon;

L) machine reading said second machine-readable delivery notice code from said second delivery notice and storing corresponding electronic data associated with said second machine-readable delivery notice code;

M) machine reading said machine-readable item code from each of said first plurality of items and said at least one additional unique item, and storing electronic data associated with said first plurality of items and said at least one additional unique item;

N) electronically linking said electronic data associated with said second machine-readable delivery notice code with said electronic data associated with said first plurality of items and said at least one additional unique item;

O) reporting information regarding each of said first plurality of unique items in response to receipt of a description of said first delivery notice; and P) reporting information regarding each of said first plurality of unique items and said at least one additional unique item in response to receipt of a description of said second delivery notice.

* * * * *